(12) United States Patent
Mijers

(10) Patent No.: US 7,360,556 B2
(45) Date of Patent: Apr. 22, 2008

(54) CHECK VALVE

(75) Inventor: Jan W. M. Mijers, Heemstede (NL)

(73) Assignee: Filtertek Inc., Hebron, IL (US)

( * ) Notice: Subject to any disclaimer, the term of this patent is extended or adjusted under 35 U.S.C. 154(b) by 0 days.

(21) Appl. No.: 11/643,382

(22) Filed: Dec. 20, 2006

(65) Prior Publication Data
US 2007/0163656 A1 Jul. 19, 2007

Related U.S. Application Data

(63) Continuation of application No. PCT/EP2005/006646, filed on Jun. 20, 2005.

(51) Int. Cl.
F16K 17/18 (2006.01)
(52) U.S. Cl. .............. 137/493.9; 137/512.4; 604/99.02; 604/99.03
(58) Field of Classification Search ........... 137/493, 137/493.9, 512.4, 493.8; 604/99.02, 99.03
See application file for complete search history.

(56) References Cited

U.S. PATENT DOCUMENTS

| 2,133,575 | A | * | 10/1938 | Rosenberg | ............... 137/493.2 |
|---|---|---|---|---|---|
| 3,623,504 | A | | 11/1971 | Davis | |
| 3,794,043 | A | | 2/1974 | McGinnis | |
| 4,188,978 | A | | 2/1980 | De Lorenzo | |
| 4,535,820 | A | | 8/1985 | Raines | |
| 4,630,606 | A | | 12/1986 | Weerda et al. | |
| 4,781,674 | A | | 11/1988 | Redmond et al. | |
| 4,825,862 | A | | 5/1989 | Sato et al. | |
| 4,922,954 | A | * | 5/1990 | Blomquist et al. | .......... 137/493 |
| 4,946,448 | A | * | 8/1990 | Richmond | .................. 604/247 |
| 5,169,393 | A | * | 12/1992 | Moorehead et al. | ........ 604/247 |
| 5,277,171 | A | | 1/1994 | Lannes | |
| 5,617,897 | A | | 4/1997 | Myers | |
| 6,708,714 | B1 | | 3/2004 | Mijers | |
| 2002/0096214 | A1 | * | 7/2002 | Bauer | ......................... 137/493 |

FOREIGN PATENT DOCUMENTS

| BE | 1 009 834 A6 | 10/1997 |
|---|---|---|
| DE | 48105 | 6/1888 |
| DE | 33 27 342 A1 | 2/1985 |
| DE | 34 35 900 A1 | 4/1986 |
| DE | 43 15 701 A1 | 11/1994 |
| DE | 295 19 322 U1 | 2/1996 |
| DE | 297 09 021 U1 | 7/1997 |
| DE | 195 45 421 C2 | 5/2001 |
| DE | 20 2004 009 521 U1 | 10/2004 |
| DE | 10 2004 053 214 A1 | 1/2006 |
| EP | 0 334 157 B1 | 9/1989 |

(Continued)

Primary Examiner—Stephen M. Hepperle
(74) Attorney, Agent, or Firm—Brinks Hofer Gilson & Lione

(57) ABSTRACT

A check valve is provided, including a first hose connector housing defining an entry passage and a first valve seat, a second hose connector housing engaging the first hose connector housing and defining an exit passage, a generally flexible, perforate membrane disk positioned between the first and second hose connector housings and pretensioned against the first valve seat to selectively sealingly separate the first and second hose connector housings, and a one-way relief valve fluidly connected with the exit passage and configured to permit venting of the exit passage upon overpressurization thereof.

20 Claims, 2 Drawing Sheets

FOREIGN PATENT DOCUMENTS

| | | |
|---|---|---|
| EP | 0 612 537 | 8/1994 |
| EP | 1 093 828 A2 | 4/2001 |
| EP | 1 099 457 A2 | 5/2001 |
| GB | 439278 | 12/1935 |
| NL | 293686 | 4/1965 |

* cited by examiner

CHECK VALVE

CROSS-REFERENCE TO RELATED APPLICATION

This patent application is a continuation of International Application PCT/EP2005/006646 published as PCT patent application WO 2005/124208 A1, with an international filing date of Jun. 20, 2005 and entitled "CHECK VALVE," which claims the benefit of priority to German patent application DE 20 2004 009 831.8, filed Jun. 22, 2004 and entitled "Rückschlagventil," the entire contents of each of which are incorporated herein by reference.

FIELD OF THE INVENTION

This invention relates to a check valve, such as a check valve suited for medical applications.

BACKGROUND

Check valves may be used to selectively fluidly connect a first hose with a second hose. More specifically, check valves known in the art may be used to permit fluid flow in a first direction and to prevent or restrict flow in a second, opposite direction. One such known check valve includes a first hose connector housing, a second hose connector housing, and a membrane disk of flexible material positioned between the two hose connector housings. The membrane disk is selectively sealingly seated on a valve seat to selectively separate the first and second hoses from each other. Specifically, when unaffected by external forces the membrane disk is seated on the valve seat. However, when a sufficient external force acts on the membrane disk, such as fluid pressure from fluid flowing along the first hose, the membrane disk becomes unseated and permits fluid connection between the first and second hoses. More specifically, the membrane disk defines an opening that permits fluid flow therethrough when the membrane disk is unseated from the valve seat, thereby connecting the first and second hoses. Such a design is disclosed in European patent 0 612 537 and U.S. Pat. No. 5,617,897, the entire contents of each of which are incorporated herein by reference.

In some applications, such as medical applications, it may be desirable to limit pressure able to be exerted on the exit side of the check valve. However, check valves are typically designed to permit fluid travel from the entry passage to the exit passage and to prohibit travel in the opposite direction.

It is therefore desirable to provide a check valve that meets applicable standards, that is relatively simple and economical to manufacture, and that limits the maximum pressure able to be exerted on the exit side of the check valve.

BRIEF SUMMARY

This invention seeks to address the above-mentioned shortcomings of the prior art. A check valve is provided, including a first hose connector housing defining an entry passage and a first valve seat, a second hose connector housing engaging the first hose connector housing and defining an exit passage, a generally flexible perforate membrane disk positioned between the first and second hose connector housings and pretensioned against the first valve seat to selectively sealingly separate the first and second hose connector housings, and a one-way relief valve fluidly connected with the exit passage and configured to permit venting of the exit passage upon overpressurization thereof.

In one aspect, a first portion of the membrane disk, such as a central portion thereof, is pretensioned against the first valve seat and a second portion of the membrane disk, such as an outer portion thereof, is pretensioned against a second valve seat. The membrane disk may be pretensioned against the first valve seat to selectively seal a first path between the first and second hose connector housings, thereby functioning as a check valve. The outer portion of the membrane disk may be pretensioned against the second valve seat to selectively seal a second path between the first and second hose connector housings, thereby functioning as a one-way relief valve.

In another aspect, at least one of the first and second hose connector housings defines an annular relief space and the one-way relief valve is positioned within the annular relief space.

In yet another aspect, the membrane disk includes a clamped portion secured between the first and second hose connector housings and the membrane disk further includes an outer portion projecting radially from the clamped portion within the annular relief space. The outer portion may be pretensioned against a second valve seat to selectively divide the annular relief space into an annular entry chamber and an annular exit chamber. The annular entry chamber may be fluidly connected to the exit passage by a connection channel and the annular exit chamber may be fluidly connected to the entry passage by a second connection channel.

In another aspect, the first and second hose connector housings may include opposing webs securing the clamped portion of the membrane disk therebteween. The opposing webs may define a circumferential wall of the annular relief space.

In yet another aspect, the membrane disk may define an opening for selectively fluidly connecting the entry passage and the exit passage when the membrane disk is unseated. For example, the opening may be surrounded by the valve seat. The first hose connector housing may define at least one connection channel extending from the entry passage to an entry space.

In another aspect, the check valve is configured for use with a respiratory tube having an inflatable cuff.

DETAILED DESCRIPTION OF THE DRAWINGS AND THE PRESENTLY PREFERRED EMBODIMENTS

Figure 1:
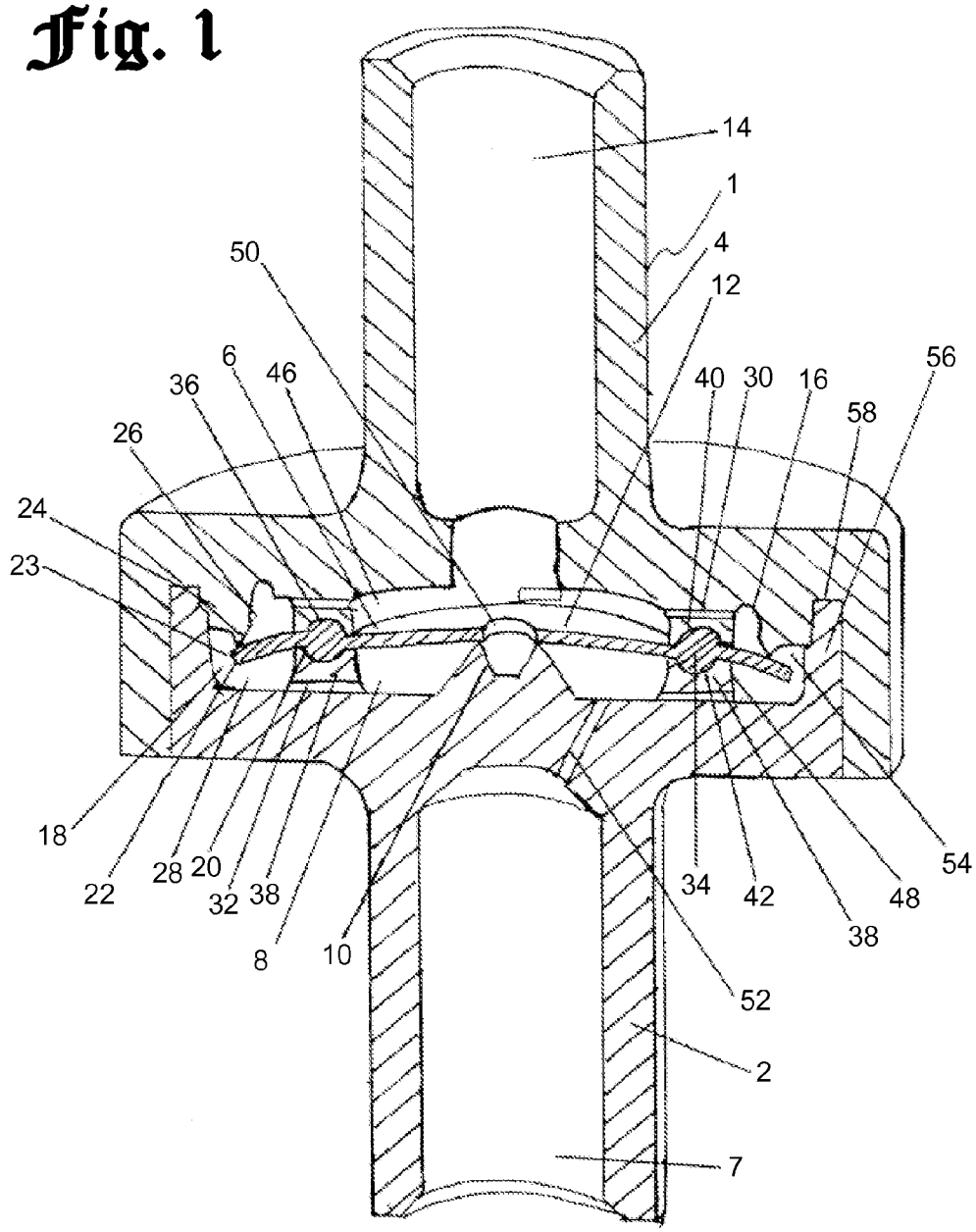
FIG. 1 is a partial-section, schematic view of a check valve emboding principles of the present invention.

Referring now to preferred embodiments, FIG. 1 shows a check valve 1 in a schematic cross-sectional view. The check valve generally includes a first hose connector housing 2, a second hose connector housing 4, and a perforate membrane disk 6 positioned between the housings 2, 4. The membrane disk 6 is preferably made of a flexible material such as silicone, silicone rubber, or rubber.

The membrane disk 6 is pretensioned against a first valve seat 10 monolithically formed in an entry space 8 of the first hose connector housing 2. When the pressure in the entry passage 7 of the first hose connector housing 2 reaches a particular level, the membrane disk 6 will be lifted from the first valve seat 10 such that the entry space 8 is fluidly connected to an exit space 12 in the second hose connector housing 4, as will be discussed further below. Thus, the membrane disk 6 and the first valve seat 10 cooperate to function as a check valve.

Additionally, the check valve 1 includes a relief valve 16 to prevent the pressure in the exit passage 14 from reaching an undesirably high pressure. For example, the relief valve 16 is fluidly connected with the exit passage 14 and is configured to permit venting of the exit passage 14 upon overpressurization thereof. In FIG. 1, the relief valve 16 is fluidly connected to the exit passage 14 via the exit space 12 and the relief valve 16 includes an outer portion of the membrane disk 6, as will be discussed in further detail below.

The check valve 1 shown in FIG. 1 may be particularly suited for medical applications. For example, referring to FIG. 2. the check valve 1 may be coupled with a respiratory tube 101 for inflating an inflatable cuff 108 of the respiratory tube 101. Respiratory tubes 101 typically include a breathing tube 104 for delivering air to a patient's lungs, an inflatable cuff 108 inserted within a patient's trachea 102 to prevent back-flow of the air delivered to the patient's lungs, and a connection line 110 for inflating the inflatable cuff 108. The breathing tube 104 includes a proximal end 112 for connection with an air supply and a distal end 106 for insertion within the patient's trachea 102. inflatable cuffs 108 are typically inserted into the patient's trachea 102 in a deflated state and are then filled with air to form a generally air-tight seal with the trachea 102 inner walls, thereby preventing the air delivered to the patient's trachea 102 from flowing back towards the patient's mouth. A respiratory tube device is disclosed in U.S. patent application Ser. No. 11/633,271, now published as Publication No. 2007/0163599, entitled "APPARATUS FOR CONNECTING A RESPIRATORY DEVICE WITH A PATIENT," naming Jan W. M. Mijers as an inventor and filed Dec. 4, 2006, the entire contents of which is herein incorporated by reference.

Figure 2:
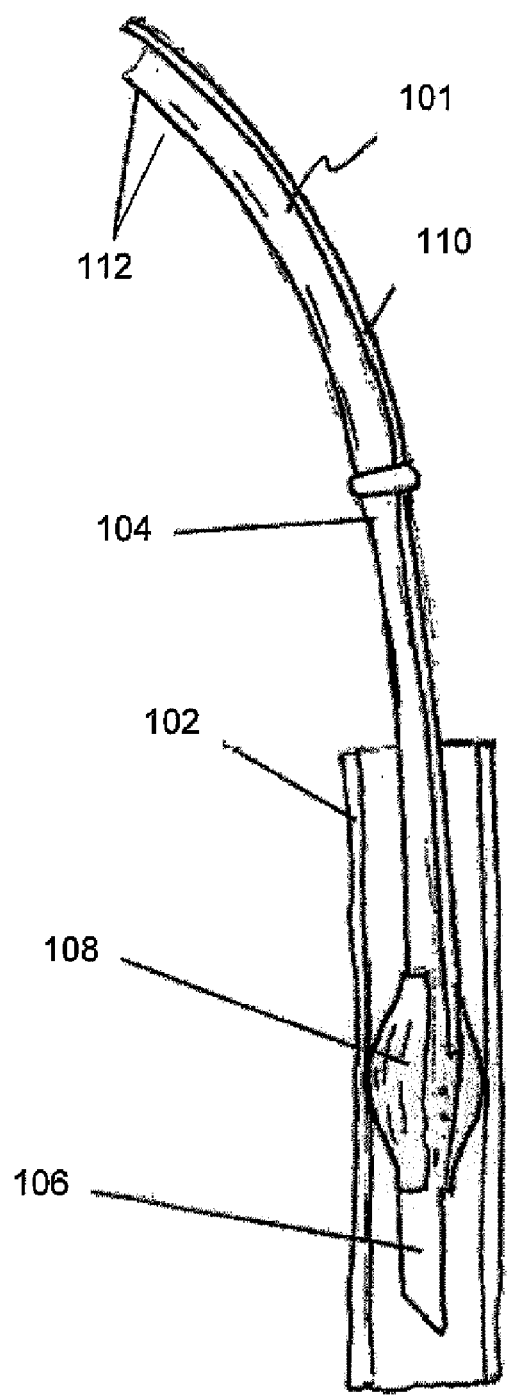
FIG. 2 is a partial-section, schematic view of a device for connecting a respiratory device with a patient's trachea 2.

The check valve 1 shown in FIG. 1 may be connected to respiratory tube 101 shown in FIG. 2 by fluidly connecting the exit passage 14 of the second hose connector housing 4 to the connection line 110 of the inflatable cuff 108. Then, the inflatable cuff 108 may be inflated by an air source connected to the entry passage 7. For example, a 50 ml syringe may be connected to the entry passage 7 of the first hose connector housing 4. After the inflatable cuff 108 is inflated to a desired pressure, the syringe is removed so the pressure at the entry passage 7 of the first hose connector housing 2 is the atmospheric pressure. Therefore, if the air pressure within the inflatable cuff 108 reaches an undesirably high level, for example due to movement of the patient or due to a change of air pressure within the patient's lungs, air from the inflatable cuff 108 is able to be vented from the exit passage 14 to the entry passage 7 and into the atmosphere via the relief valve 16, as will be discussed further below.

The first and second hose connector housings 2, 4 cooperate to define an annular relief space 18 positioned radially outwardly of the entry space 8. More specifically, in FIG. 1, the annular relief space 18 is formed by corresponding, opposing annular recesses in the first and second hose connector housings 2, 4.

The outer portion of the membrane disk 6 includes an annular marginal strip 22 radially exterior of its clamping point 20 that projects into the annular relief space 18 such that the outer edge 23 of the membrane disk can move upwardly and downwardly in a cantilever-like fashion. A second annular valve seat 24 is located within the annular relief space 18 and projects in the direction of the first hose connector housing 2, i.e. in the direction of the entry space 8. The second valve seat 24 pretensions the marginal strip 22 of the membrane disk in the direction of the entry space 8 such that the section of the membrane disk 6 between the clamping point 20 and the second valve seat 24 divides the relief space 18 into an annular entry chamber 26 and an annular exit chamber 28. The second valve seat 24 may be monolithically formed with the second hose connector housing 4.

The annular entry chamber 26 is connected with the exit space 12 of the second hose connector housing 4 by one or more connection channels 30 and the annular exit chamber 28 is connected with the entry space 8 of the first hose connector housing 2 by one or more connection channels 32.

The membrane disk 6 includes a clamped portion for securing the membrane disk 6 between the first and second hose connector housings 2, 4. For example, as shown in FIG. 1, the membrane disk 6 includes an annular protrusion 34 radially inwardly of the marginal strip 22. The annular protrusion 34 may be monolithically formed with the membrane disk 6 by a suitable method, such as injection molding. The first hose connector housing 2 and the second hose connector housing 4 in FIG. 1 are each provided with opposing annular webs 36, 38 for securing the annular protrusion 34. For example, the annular webs 38, 38 each include an annular groove 40 and 42 for securing the annular protrusion 34. The annular grooves 40 and 42 receive the annular protrusion 34 to clamp the membrane disk 6 between the two hose connector housings 2, 4, thereby pretensioning the center section of the membrane disk 6 against the first valve seat 10.

As shown in FIG. 1, the annular webs 36 and 38 define the circumferential wall 44 of a cavity 46 that is divided Into the entry space 8 and the exit space 12 by the membrane disk 6. Additionally, the annular webs 36, 38 define the connection channels 30, 32. Furthermore, the annular webs 36, 38 define the radial inner wall 48 of the relief space 18.

As also shown in FIG. 1, the membrane disk 6 includes a central opening 50 which is selectively sealingly separated from the entry space 8 by the first valve seat 10. The entry space 8 is fluidly connected with the entry passage 7 of the first hose connector housing 2 by one or more connection channels 52. Therefore, incoming air is able to flow from the entry passage 7 to the entry space 8 by the connection channels 52 and the air pressure differential between the entry space 8 and the exit space 12 causes the membrane disk 6 to become unseated from the first valve seat 10, thereby fluidly connecting the entry space 8 to the exit space 12 via the opening 50.

The radial outer wall 54 defining the relief space 18 includes an upwardly projecting annular skirt 56 that engages a corresponding annular groove 58 of the second hose connector housing 4. The annular skirt 56 and the annular groove 58 cooperate to form a connection between the two hose connector housings 2, 4. The annular skirt 56 and the annular groove 58 may also be fixedly connected by a suitable method, such as welding, ultrasonic welding, by use of medically approved adhesives (e.g. ultra-violet curing adhesives), or by a combination thereof. The housings may be comprised of polymeric materials that are generally medically accepted, e.g. polystyrenes, styrenic copolymers (A.B.S.) or polycarbonates.

During use of the check valve 1, when the pressure differential between the exit space 12 and the entry space 8 reaches a particular level, air is able to be vented from the exit space 12 to the entry space 8 by airflow through the connection channels 30, 32 and by downward movement of the marginal strip 22. More specifically, the marginal strip 22 is able to be lifted from the second valve seat 24 such that air flows from the entry chamber 26 above the marginal strip 22 to the exit chamber 28 below the marginal strip 22.

It is therefore intended that the foregoing detailed description be regarded as illustrative rather than limiting, and that it be understood that it is the following claims, including all equivalents, are intended to define the spirit and scope of this invention. More particularly, the apparatus and assembly described are merely an exemplary apparatus and assembly, and they are not intended to be limiting.

What is claimed is:

1. A check valve comprising:
   a first hose connector housing defining an entry passage and a first valve seat;
   a second hose connector housing engaging the first hose connector housing and defining an exit passage;
   a generally flexible, perforate membrane disk having a clamped portion fixably clamped between the first and second hose connector housings and a first portion pretensioned against the first valve seat to selectively sealingly separate the entry passage and the exit passage; and
   a one-way relief valve fluidly connected with the exit passage and configured to permit venting of the exit passage upon overpressurization thereof.

2. A check valve as in claim 1, wherein the one-way relief valve includes a second portion of the membrane disk pretensioned against a second valve seat.

3. A check valve as in claim 2, wherein the second portion of the membrane disk includes an outer portion of the membrane disk pretensioned against the second valve seat.

4. A check valve as in claim 3, wherein the first portion of the membrane disk is pretensioned against the first valve seat to selectively seal a first path between the first and second hose connector housings and wherein the outer portion of the membrane disk is pretensioned against the second valve seat to selectively seal a second path between the first and second hose connector housings.

5. A check valve as in claim 1, wherein at least one of the first and second hose connector housings defines an annular relief space and wherein the one-way relief valve is positioned within the annular relief space.

6. A check valve as in claim 5, wherein the clamped portion of the membrane disk is clamped between the first and second hose connector housings and wherein the membrane disk includes an outer portion projecting radially from the clamped portion within the annular relief space.

7. A check valve as in claim 6, wherein the outer portion is pretensioned against a second valve seat to selectively divide the annular relief space into an annular entry chamber and an annular exit chamber.

8. A check valve as in claim 7, wherein the annular entry chamber is fluidly connected to the exit passage by a connection channel.

9. A check valve as in claim 5, wherein the annular exit chamber is fluidly connected to the entry passage by a second connection channel.

10. A check valve as in claim 6, wherein the first and second hose connector housings each include opposing webs securing the clamped portion of the membrane disk therebteween.

11. A check valve as in claim 10, wherein the clamped portion of the membrane disk is an annular protrusion.

12. A check valve as in claim 10, wherein the opposing webs define a circumferential wall of the annular relief space.

13. A check valve as in claim 1, wherein the membrane disk defines an opening for selectively fluidly connecting the entry passage and the exit passage when the membrane disk is unseated.

14. A check valve as in claim 13, wherein the opening is surrounded by the valve seat.

15. A check valve as in claim 13, wherein the first hose connector housing cooperates with the membrane disk to define an entry space and the first hose connector housing defines at least one connection channel extending from the entry passage to the entry space.

16. A check valve as in claim 1, wherein the exit passage is fluidly connected with a respiratory tube having an inflatable cuff such that the membrane disk is configured to permit venting of the exit passage upon overpressurization of the inflatable cuff.

17. A check valve as in claim 16, wherein the inflatable cuff is configured to be inflated with air.

18. A check valve comprising:
   a first hose connector housing defining an entry passage and a first valve seat;
   a second hose connector housing engaging the first hose connector housing and defining an exit passage;
   a generally flexible, perforate membrane disk clamped between the first and second hose connector housings, the membrane disk having a central portion pretensioned against the first valve seat to selectively sealingly separate the entry passage and the exit passage, an outer portion gretensioned against a second valve seat to permit venting of the exit passage upon overpressurization thereof, and a clamped portion fixably clamped between the central portion and the outer portion.

19. A check valve as in claim 18, wherein the first and second hose connector housings each include opposing webs securing the clamped portion of the membrane disk therebteween.

20. A check valve as in claim 19, wherein the clamped portion of the membrane disk is an annular protrusion.

* * * * *